(12) United States Patent
Robinson et al.

(10) Patent No.: US 8,730,653 B2
(45) Date of Patent: May 20, 2014

(54) INTERIOR ASSEMBLY FOR A THREE PHASE LOAD CENTER

(75) Inventors: Kristopher Scott Robinson, Atlanta, GA (US); Jeffrey Kenton Hudgins, Jr., Gainesville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 70 days.

(21) Appl. No.: 13/362,028

(22) Filed: Jan. 31, 2012

(65) Prior Publication Data

US 2012/0218686 A1    Aug. 30, 2012

Related U.S. Application Data

(60) Provisional application No. 61/438,702, filed on Feb. 2, 2011.

(51) Int. Cl.
*H02B 1/20*   (2006.01)

(52) U.S. Cl.
USPC ............ 361/648; 361/637; 361/644; 361/650

(58) Field of Classification Search
USPC .................. 361/637, 641, 644, 648, 650, 658
See application file for complete search history.

(56) References Cited

U.S. PATENT DOCUMENTS

| | | | | | |
|---|---|---|---|---|---|
| 5,272,591 | A | * | 12/1993 | Blue et al. | 361/622 |
| 5,272,592 | A | * | 12/1993 | Harris et al. | 361/637 |
| 5,721,667 | A | * | 2/1998 | Rose | 361/627 |
| 5,784,250 | A | * | 7/1998 | Rose | 361/627 |
| 5,786,982 | A | * | 7/1998 | Rose et al. | 361/637 |
| 5,969,937 | A | * | 10/1999 | Rose et al. | 361/645 |
| 6,266,232 | B1 | * | 7/2001 | Rose et al. | 361/645 |
| 2011/0096470 | A1 | * | 4/2011 | Dixon et al. | 361/636 |
| 2013/0220669 | A1 | * | 8/2013 | Robinson et al. | 174/135 |

* cited by examiner

*Primary Examiner* — Robert J Hoffberg (57) ABSTRACT

An interior assembly for a three phase load center. The interior assembly includes a base pan having at least one first module that includes a first receptacle portion and a first base portion. The base pan also includes at least one second module having a second receptacle portion and a second base portion. Each receptacle portion includes a receptacle wall having a receptacle edge portion. Each base portion includes a base wall having a base edge portion wherein upon insertion of the second base portion into the first receptacle portion the receptacle and base edge portions engage to attach the first module to the second module and form a modular base pan. The base pan further includes a bus bar located on a back side of the first and second modules and a plurality of insulators for insulating the bus bar.

20 Claims, 9 Drawing Sheets

INTERIOR ASSEMBLY FOR A THREE PHASE LOAD CENTER

CROSS REFERENCE TO RELATED APPLICATIONS

This application claims the benefit under 35 U.S.C. §119 (e) of U.S. Provisional Application No. 61/438,702 entitled 3-PHASE LOADCENTER MODULAR INTERIOR DESIGN, filed on Feb. 2, 2011 which is incorporated herein by reference in its entirety and to which this application claims the benefit of priority.

FIELD OF THE INVENTION

This invention relates to a modular base pan for a three phase load center, and more particularly, to a base pan having a first module which includes a receptacle portion for attaching to a base portion of a second module wherein a bus bar is insulated from the base pan by a plurality of insulators.

BACKGROUND OF THE INVENTION

A load center provides overcurrent protection for an electrical system of a building and distributes power to various branch circuits of the electrical system. In particular, a load center may be configured either as a main breaker device including items such as a main circuit breaker, branch circuit breakers and other components or as a main lug device.

Various components of a load center such as bus bars, neutral bars and others are mounted to a base pan located in an enclosure. The base pan is fabricated from an electrically insulative material such as plastic and may be formed by an injection molding or an extrusion process. During assembly, the base pan is cut to a specific size in order to accommodate the number of circuits being utilized in a particular load center.

The bus bars serve as a common connection for two or more circuits and may be used to connect circuit breakers to service conductors and load wiring. In conventional three phase bus bar designs that include an integral stab, the bus bars are mounted in close proximity to each other and in a semi-stacked arrangement resulting in closely spaced stabs that are vertically aligned. This requires electrically isolating each bus bar from the other so as to prevent short circuiting between phase to phase or phase to ground.

However, several components and assemblies are needed to isolate the bus bars. In particular, first and second phase bus bars are attached on a front side of the base pan assembly and a third phase bus bar is mounted on a back side by inserting stabs through slots that align with the front mounted bus bars. The third phase bus bar is isolated by attaching an insulator sheet that is specifically sized for the bus bar being used. Use of the insulator sheet requires several fasteners in order to assemble the insulator sheet to the back side of the base pan. Fasteners are also required to attach the first and second phase bus bars to the front side of the base pan. Further, additional components and fasteners are needed to isolate a third phase load strap and to define a wire-way on the base pan in order to meet safety standards. Such additional components and fasteners increase complexity in assembling three phase load centers. In addition, having to provide specifically sized components for various length load center interiors creates inventory management challenges.

SUMMARY OF THE INVENTION

An interior assembly for a three phase load center is disclosed. The interior assembly includes a base pan having at least one first module that includes a first receptacle portion and a first base portion. The base pan also includes at least one second module having a second receptacle portion and a second base portion wherein the second base portion is received by the first receptacle portion to secure the first module to the second module and form a modular base pan assembly that is expandable. The base pan further includes a bus bar located on a back side of the first and second modules. In addition, the base pan includes a plurality of insulators for insulating the bus bar, wherein each insulator includes a post that is inserted through the bus bar and is attached to a module to secure the bus bar between the insulators and the first and second modules.

BRIEF DESCRIPTION OF THE DRAWINGS

FIG. 5b is a partial cross sectional view of an assembled insulator along view line 1-1 of FIG. 5a.

DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-9b.

Figure 1:
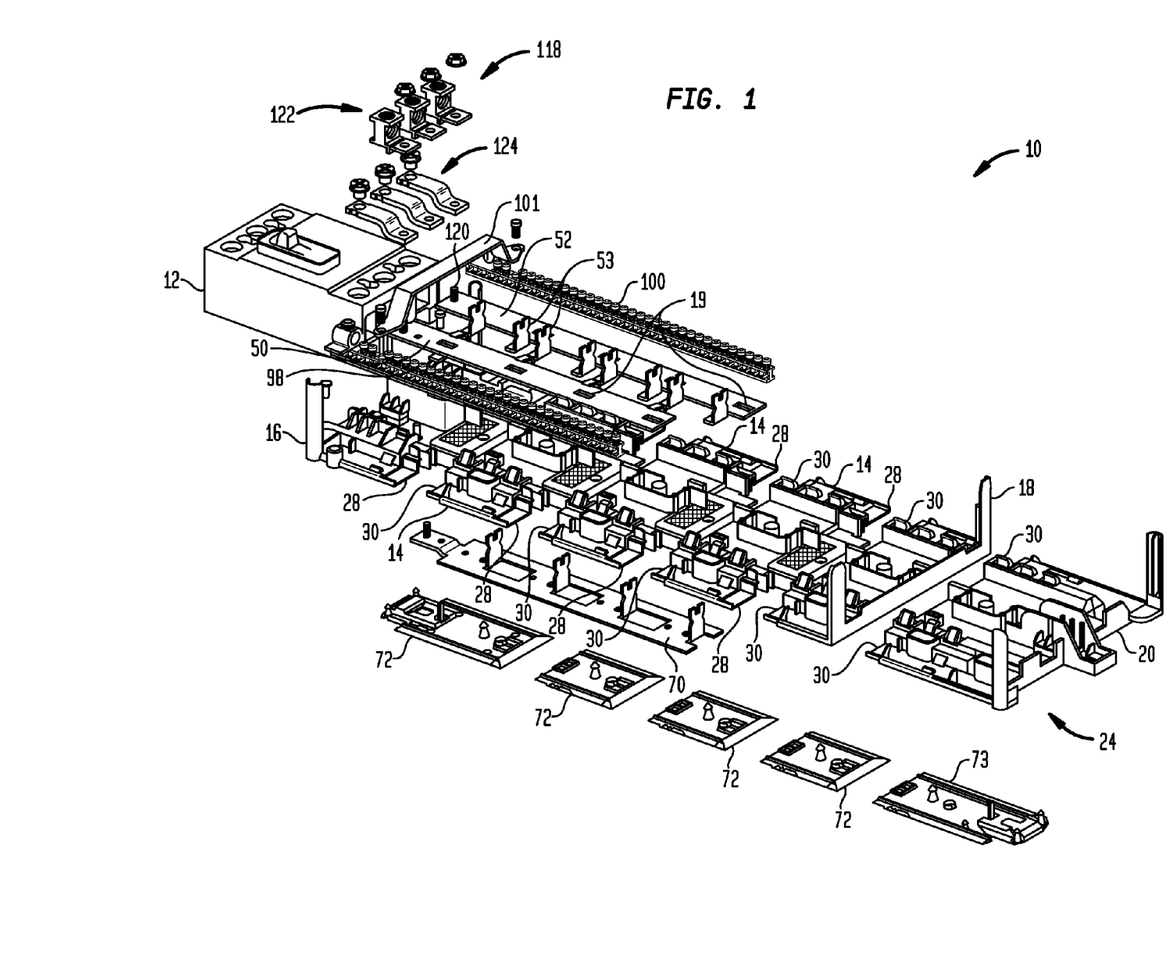
FIG. 1 depicts a three phase load center interior assembly in accordance with the present invention.

Referring to FIG. 1, a three phase load center interior assembly 10 suitable for configuring as either a main breaker device 126 (see FIG. 9a) including a main circuit breaker 12 or a main lug device 116 (see FIG. 9b) including main lugs 118 is shown in an exploded view. The interior assembly 10 includes a plurality of mid-modules 14 located between a top module 16 and a bottom module 18 to form a modular base pan assembly 24. Alternatively, the bottom module 18 may be replaced by a feed-through module 20. In one embodiment, the top 16, mid-module 14, bottom 18 and feed-through modules, along with associated components used for attaching items to the modules 16,14,18,20 are each fabricated from a resilient material having insulative properties such as plastic by using an extrusion or injection molding process.

Figure 2:
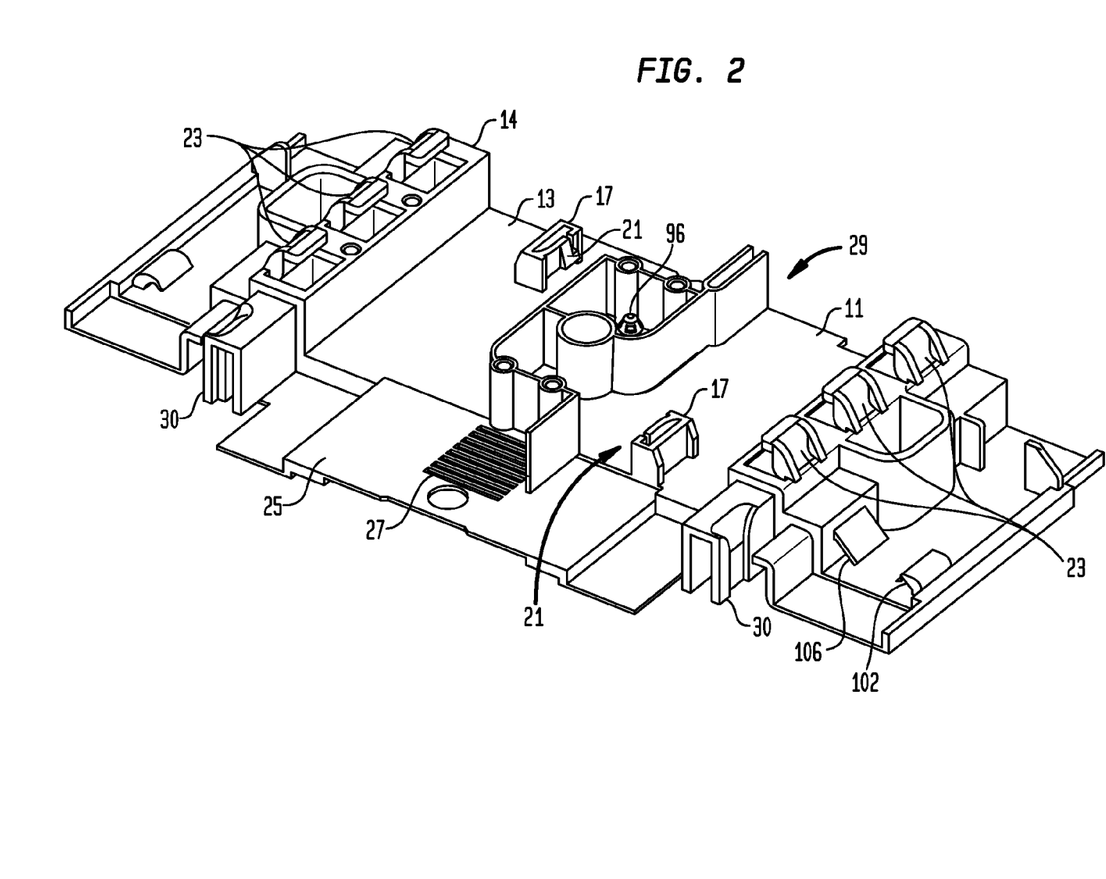
FIG. 2 depicts an exemplary mid-module for a modular base pan assembly.

Referring to FIG. 2, an exemplary mid-module 14 is shown. It is noted that several of the features of the mid-module 14 are also found on the top 16 and bottom 18 modules. The mid-module 14 includes first 11 and second 13 channel areas for accommodating first 50 and second 52 phase bus bars (see FIG. 1) having side stabs 53. The first 11 and second 13 channel areas include rectangularly shaped guide bosses 17 which fit into corresponding guide apertures 19 (see FIG. 1) in the first 50 and second 52 phase bus bars. The guide bosses 17 serve to align the first 50 and second 52 phase bus bars in the channel areas 11,13. The bosses 17 also include side snaps 21 which serve to attach to a side portion of a bus bar 50,52 to the channel areas 11,13. The mid-module 14 also includes a plurality of spaced apart members 23 that are elevated relative to the channel areas 11,13 and are located in dual rows on the mid-module 14. The members 23 are used to secure branch circuit breakers to the interior assembly 10 (FIG. 1).

Figure 2A:
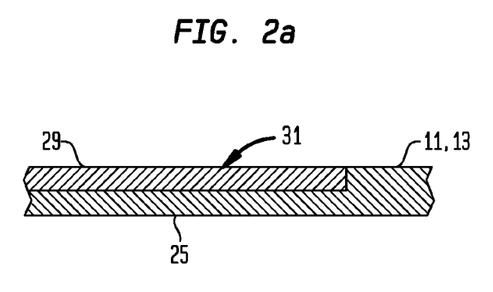
FIG. 2a depicts an overlap section between adjoining base pan modules.

A first end of the mid-module 14 includes an over surface spacing lower extension 25 having grooves 27. The lower extension 25 is stepped and is formed at a lower height than the channel areas 11,13. The lower extension 25 is adapted to be received underneath an upper extension 29 formed in an adjoining module 16,14,18,20 to form a first overlap section 31 when the modules are assembled (see FIG. 2a). The first overlap section 31 provides isolation for ends of adjoining modules 16,14,18,20 in accordance with over-surface electrical spacing requirements such as those set forth in Underwriters Laboratories (UL) and National Electric Code (NEC) standards and others. In addition, a second end of the mid-module 14 includes an upper extension 29 for receiving a lower extension 25 from an adjoining module 16,14,18,20.

Figure 3:
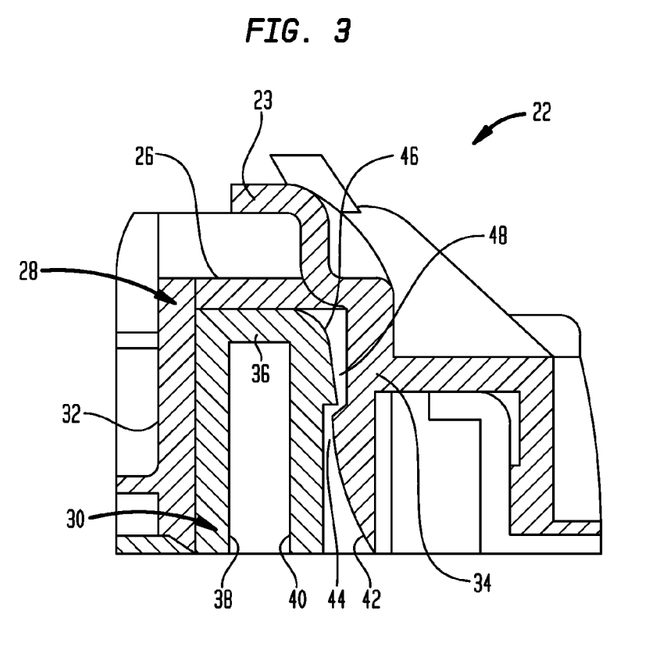
FIG. 3 is a cross sectional view of an assembled saddle snap connection.

The mid-modules 14 are attached to each other and to the top 16 and bottom 18 modules using a saddle snap connection. Referring to FIG. 3, a cross sectional view of an assembled saddle snap connection 22 for attaching a mid-module 14 to a top module 16 is shown. The saddle snap connection 22 includes a base portion 30 that is located within a mating receptacle portion 28. The base portion 30 is formed on a top end of each mid-module 14 and the top end of the bottom module 18 (see FIGS. 1 and 2). The receptacle portion 28 is formed on a bottom end of the top module 16 and a bottom end of each mid-module 14 wherein the bottom ends oppose the first ends. The top 16, mid 14 and bottom 18 modules each include a pair of receptacle 28 and base 30 portions.

The receptacle portion 28 includes a first top wall 26 and first 32 and second 34 side walls which form a cavity. The base portion 30 includes a second top wall 36 and third 38 and fourth 40 side walls. The second side wall 34 includes an upwardly sloping surface 42 that extends toward the fourth side wall 40 and forms a stepped lower edge portion 44. The fourth side wall 40 includes a downwardly sloping surface 46 that extends toward the second side wall 34 and forms a stepped upper edge portion 48. The receptacle portion 28 and its associated features and the base portion 30 and its associated features are each fabricated as integral, one piece elements.

In order to attach a mid-module 14 to the top module 16, for example, the receptacle portion 28 of top module 16 is moved down over the base portion 30 of the mid-module 16 such that the sloping surfaces 42,44 contact each other and the base portion 30 is partially inserted into the receptacle portion 28. The receptacle portion 28 is then pushed down, thus causing the second 34 and fourth 40 side walls to deflect and enabling the sloping surfaces 42,44 to slide past each other. Once the base portion 30 is completely positioned within the receptacle portion 28, the sloping surfaces 42,44 are no longer in contact thus enabling the second 34 and fourth 40 side walls to snap back to their original positions. When this occurs the upper 48 and lower 44 edge portions engage thus attaching the mid-module 14 to the top module 16. The mid-modules 14 are attached to other mid-modules 14 and to the bottom module 18 by following substantially the same procedure to thus form the modular base pan assembly 24.

Figure 4A:
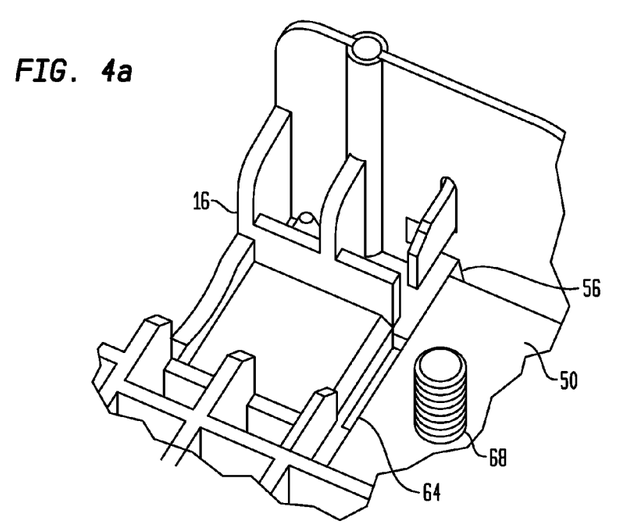
FIGS. 4a-4b depict a view of an end wall for a top, bottom and feed-through base pan module.
Figure 4B:
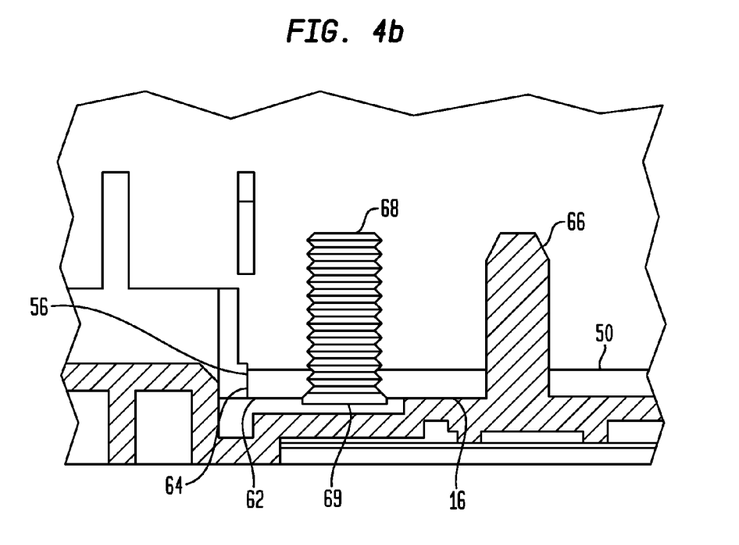

Referring to FIGS. 4a and 4b, a view of an end wall 56 of the top 16, bottom 18 and feed through 20 modules is shown. The first phase bus bar 50 rests on a surface 62 of the top module 16. A bus bar end 64 of the first phase bus bar 50 is located adjacent the end wall 56. The top module 16 may include an upstanding guide pin 66 that is inserted through a first aperture in the first phase bus bar 50 to assist in proper positioning of the first phase bus bar 50 relative to the top module 16 during assembly. In addition, a threaded stud 68 having a flange portion 69 may be inserted through a second aperture in the first phase bus bar 50 and press fit into the first phase bus bar 50 to secure the stud 68. Upon assembly, the flange portion 69 is located between the first phase bus bar 50 and the top module 16. The stud 68 may be used to electrically couple components such as breakers, connectors, and the like.

Figure 5A:
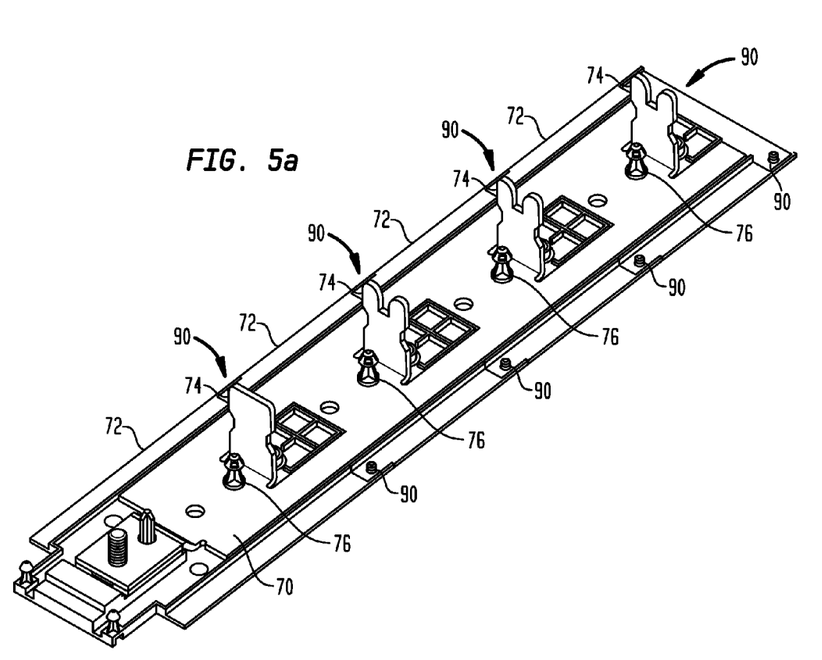
FIG. 5a depicts assembled insulators for insulating a bus bar.
Figure 5B:
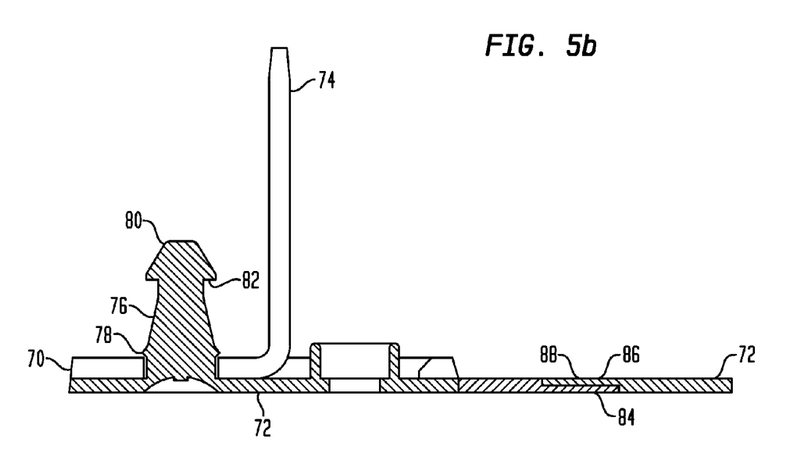

Referring back to FIG. 1, the interior assembly 10 further includes a third phase bus bar 70 and third phase insulators 72 which are attached to a bottom surface of the base pan assembly 24. Referring to FIG. 5a, a plurality of insulators 72 are shown assembled to the third phase bus bar 70. FIG. 5b is a partial cross sectional view along view line 1-1 of FIG. 5a. The third phase bus bar 70 includes a plurality of upstanding center stabs 74 for connecting to electrical devices. In addition, the insulators 72 each include an insulator post 76 having a snapable feature such as a bus bar snap ring 78 and a snap head portion 80 that includes a flange 82. The insulators 72 and associated insulator posts 76 are fabricated together by molding from a resilient material having insulative properties such as plastic. Referring to FIG. 5b, the insulator post 76 is pushed through an aperture in the third phase bus bar 70 such that the snap ring 78 is deformed as it is pushed through the aperture during assembly. Once past the aperture, the snap ring 78 returns to its original size thus capturing the third phase bus bar 70 and attaching the insulator 72 to the third phase bus bar 70.

A plurality of insulators 72 are assembled to the third phase bus bar 70 sufficient to isolate the third phase bus bar 70. The insulators 72 are assembled next to each other to achieve a desired length. The insulators 72 may be equally sized or alternatively each may be sized as needed. Each insulator 72 includes a lower end portion 84 having a reduced thickness. The lower end portion 84 is adapted to mate with an upper end portion 86 of an adjoining insulator 72 also having a reduced thickness. Upon assembly, the upper end portion 86 is positioned on top of the lower end portion 84 to create an overlap section 88 between adjoining insulators 72. The overlap section 88 serves to provide isolation for ends of adjoining insulators in accordance with over-surface electrical spacing requirements such as those set forth in UL and NEC standards and others. In addition, the lower end portion 84 includes alignment posts 90 which extend through an aperture in the upper end portion 86 to facilitate assembly of the insulators 72. Further, a feed-through insulator module 73 (see FIG. 1) is used when the feed-through module 20 is substituted for the bottom module 18.

Figure 6:
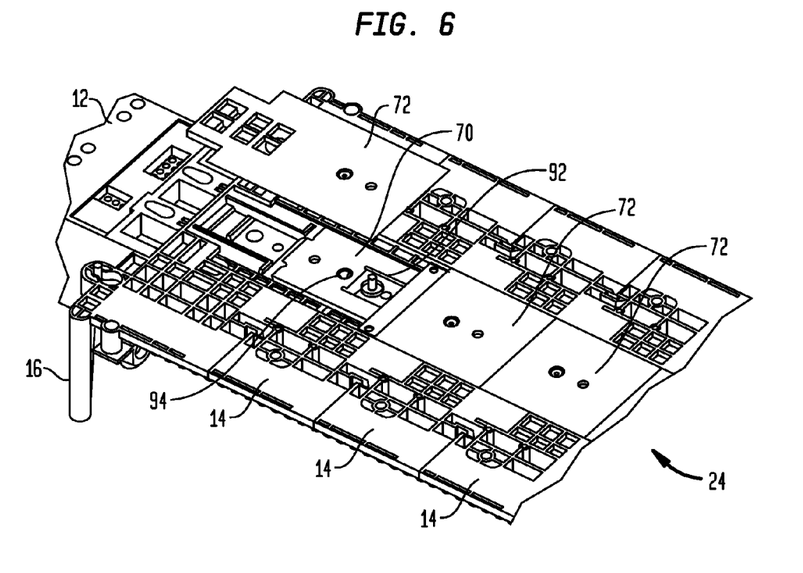
FIG. 6 is a back perspective view of the interior assembly.
Figure 7A:
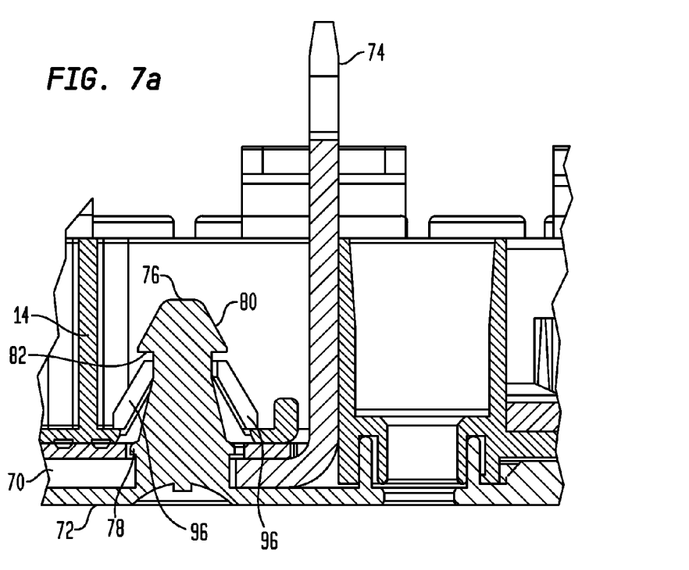
FIG. 7a is an exemplary cross sectional view depicting the assembly of an insulator, third phase bus bar and insulator post to a base pan module.

Referring to FIG. 6, a back perspective view of the base pan assembly 24 is shown. The stabs 74 of the third phase bus bar 70 and the insulator posts 76 of the insulators 72 are inserted through rectangular openings 92 and apertures 94, respectively, formed in the top 16, mid 14 and bottom 18 modules. Referring to FIG. 7*a*, an exemplary cross sectional view depicting the assembly of an insulator 72, third phase bus bar 70 and insulator post 76 to a module such as a mid-module 14 is shown. The mid-module 14 includes a snapable feature such as molded retention fingers 96 which extend from a surface of the mid-module 14 and slope upwardly toward the insulator post 76. The mid-module 14 and fingers 96 are fabricated together by molding from a resilient material such as plastic.

Figure 7B:
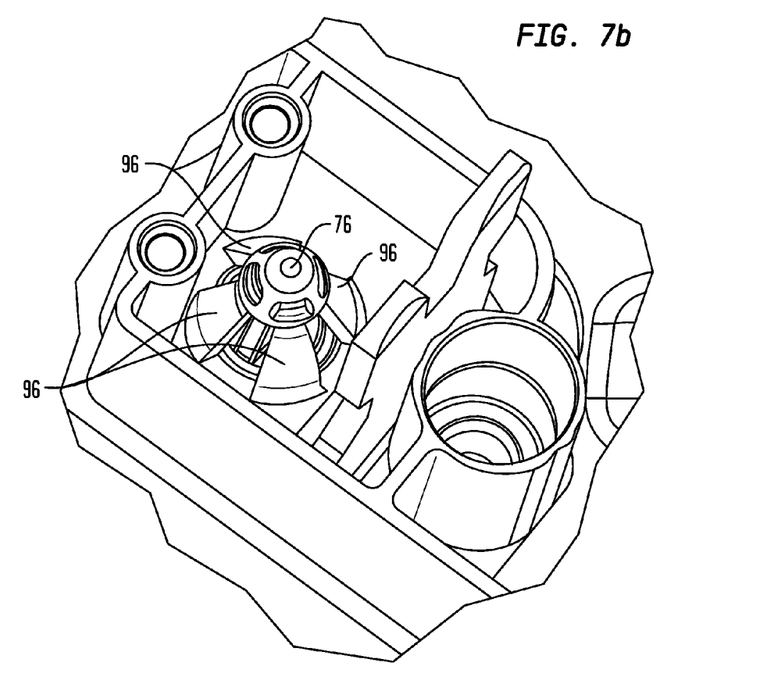
FIG. 7b is a top view of the mid-module depicting fingers.

Upon assembly, the insulator post 76 is inserted through aperture 94 such the snap head portion 80 first displaces the fingers 96 thus enabling the snap head portion 80 to advance past the fingers 96. After the flange 82 moves past the fingers 96, the fingers 96 snap back underneath the flange 82, thus capturing the insulator post 76 and securing the third phase bus bar 70 between insulator 72 and the mid-module 14. Referring to FIG. 7*b*, a top view of the mid-module 14 is shown. In one embodiment, four fingers 96 are used to secure the insulator post 76, although additional or fewer fingers 96 may also be used. Further, it is understood that the other modules 16,18,20 also include fingers 96 and are assembled using substantially the same procedure.

Figure 8A:
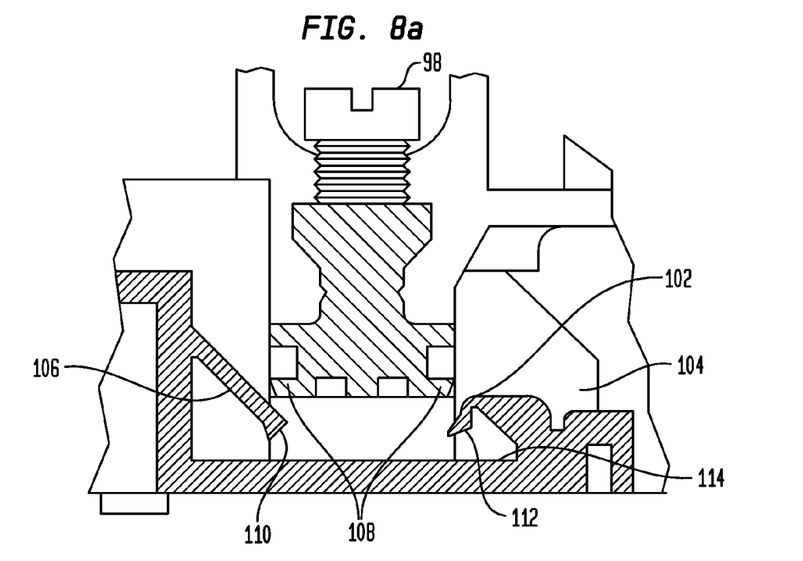
FIGS. 8a-8b depict the installation of a first neutral bar into a base pan module.
Figure 8B:
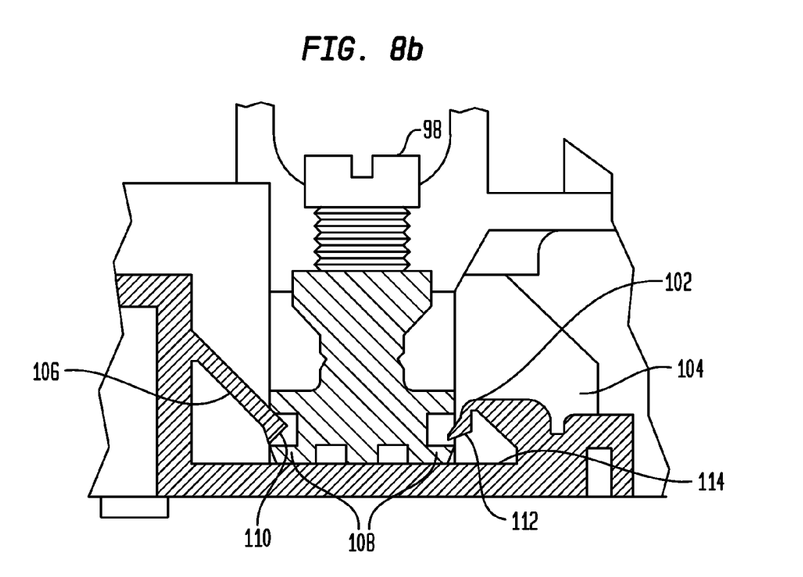

Referring back to FIGS. 1 and 2, the interior assembly 10 includes first 98 and second 100 neutral bus bars which extend along opposite side of the base pan assembly 24 from the top module 16 to the bottom module 18. Referring to FIGS. 8*a*-8*b* in conjunction with FIG. 2, installation of the first neutral bar 98 into a mid-module 14, for example, shown. The following description is exemplary and it is noted that each of the modules 16,18,20 includes attachment features for securing a neutral bus bar 98,100. In order to install the first neutral bar 98, a downward force is applied to the first neutral bar 98 thereby engaging first neutral bar 98 with swing snap 102 of wall 104 and an angled arm 106 until a neutral bar extension 108 positions and locks itself under both the swing snap 102 and angled arm 106. A first surface 110 of angled arm 106 and a first surface 112 of swing snap 102 have a non-zero angle with respect to a first surface 114 of mid-module 14, for example. Swing snap 102 and angled arm 106 therefore interfere with any vertical motion of first neutral bar 98 and serves to secure the first neutral bar 98 to the mid-module 14. In addition, a neutral tie strap 101 is fastened to the first 98 and second 100 neutral bus bars.

Figure 9A:
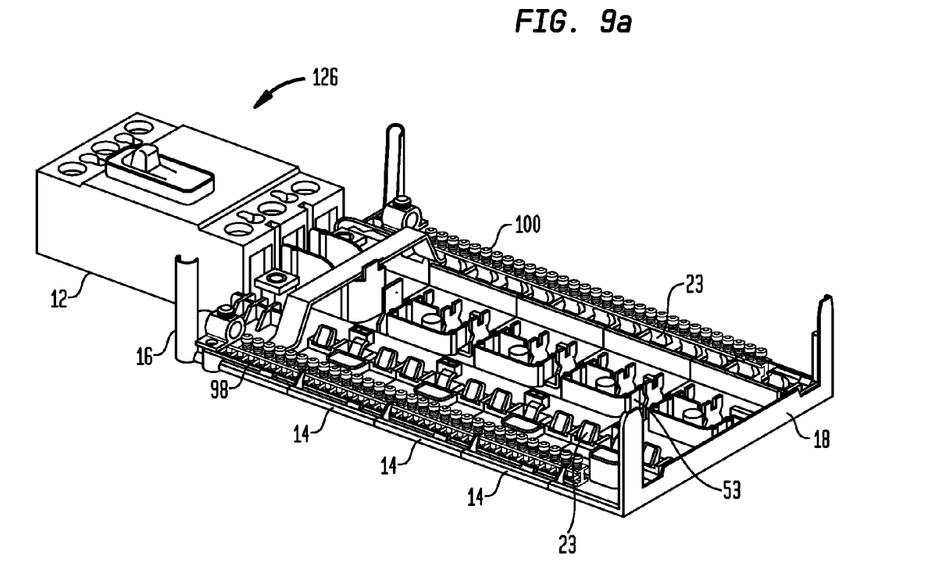
FIGS. 9a and 9b depict a main breaker and a main lug interior assembly, respectively.
Figure 9B:
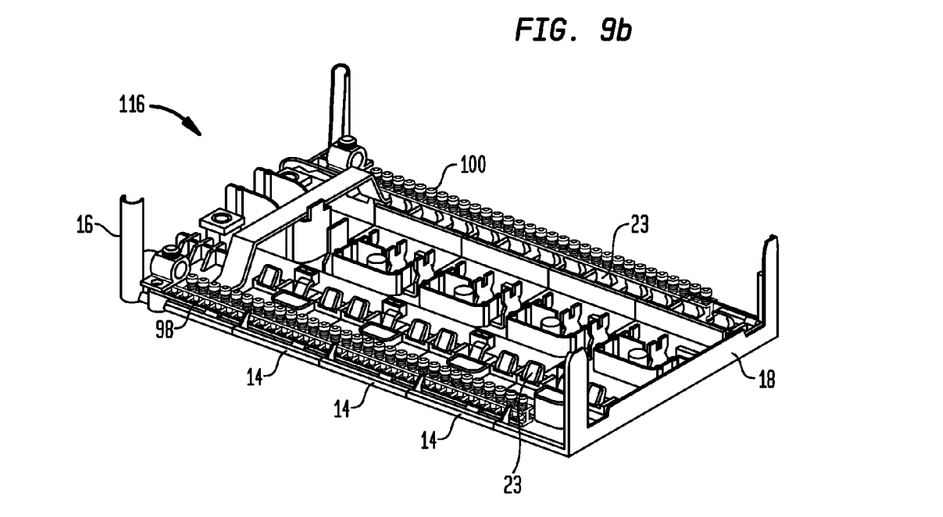

FIGS. 9*a* and 9*b* depict the main breaker device 126 and the main lug device 116 interior assemblies, respectively. Referring to FIG. 1, the main lug device 116 may be converted into the main breaker device 126 by first removing fasteners 118 from threaded studs 120 and then removing lug assemblies 122. Load straps 124 are then assembled over the threaded studs 120 and are fastened using the same fasteners 118. The main circuit breaker 12 is then inserted by sliding it under the load straps 124 and attaching to them using threaded fasteners.

The present invention enables the assembly of multiple variations of different size base pan assemblies for use in an interior of a load center by using modular base pan modules 16,14,18,20 and components and features that hand-snap together while substantially reducing the need for mechanical fasteners and insulating barriers and components. In particular, the present invention substantially reduces the need for additional bus bar fasteners, unique base pan lengths and extra components for defining wire-ways or for insulating current carrying components of opposite polarity. The modules 16,14,18,20 enable the base pan assembly 24 to be specifically configured and sized to accommodate the number of circuits being utilized in a load center. Similarly, the insulators 72 are also modular and may be configured and sized to accommodate the third phase bus bar 70 that is being used. The modular insulators 72 also facilitate the process of isolating the third phase bus bar 70. In addition, the base pan assembly 24 facilitates conversion between main breaker 126 and main lug 116 devices. Further, an additional module may be assembled to the base pan modules to create a feed-through interior device.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A load center interior, comprising:
   at least one first module having a first receptacle portion and a first base portion;
   at least one second module having a second receptacle portion and a second base portion, wherein the second base portion is received by the first receptacle portion to secure the first module to the second module to form a modular base pan assembly that is expandable;
   a bus bar located on a back side of the first and second modules; and
   a plurality of insulators for insulating the bus bar, wherein each insulator includes a post that is inserted through the bus bar and is attached to the base pan assembly to secure the bus bar between the insulators and the first and second modules.

2. The modular base pan according to claim 1, further including an overlap section between the first and second modules.

3. The modular base pan according to claim 1, further including an overlap section between each pair of the insulators.

4. The modular base pan according to claim 1, wherein the first and second modules each include fingers for capturing a flange on each post.

5. The modular base pan according to claim 1, wherein the post includes a snap ring for capturing the bus bar.

6. The modular base pan according to claim 1, wherein the first and second modules and the insulators are fabricated from a resilient material.

7. The modular base pan according to claim 1, wherein the first and second modules are fabricated from a material having insulative properties.

8. The modular base pan according to claim 1, wherein the bus bar is a third phase bus bar.

9. The modular base pan according to claim 1, further including first and second phase bus bars attached to a front side of the first and second modules.

10. The modular base pan according to claim 1, wherein the first module further includes the first base portion for attaching to a third module and the second module includes the second receptacle portion for attaching to a fourth module.

11. A modular base pan for a load center interior, comprising:
a plurality of modules each having a receptacle portion and a base portion wherein each receptacle portion includes a receptacle wall having a receptacle edge portion and each base portion includes a base wall having a base edge portion adapted to mate with the receptacle edge portion and wherein upon insertion of a base portion of a first module of the plurality of modules into a receptacle portion of a second module of the plurality of modules, the receptacle and base edge portions engage to attach the first module to the second module thereby forming a modular base pan assembly that is expandable.

12. The modular base pan according to claim 11, further including an overlap section between the first and second modules.

13. The modular base pan according to claim 11, wherein the first and second modules and the insulators are fabricated from a resilient material.

14. The modular base pan according to claim 11, wherein the base portion of the first module is attached to a third module of the plurality of modules having the receptacle portion and the base portion and the receptacle portion of the second module is attached to a fourth module of the plurality of modules having the receptacle portion and the base portion.

15. The modular base pan according to claim 11, further including first and second phase bus bars attached to a front side of the first and second modules.

16. A load center interior, comprising:
at least one first module having a first receptacle portion and a first base portion;
at least one second module having a second receptacle portion and a second base portion, wherein each receptacle portion includes a receptacle wall having a receptacle edge portion and each base portion includes a base wall having a base edge portion adapted to mate with the receptacle edge portion and wherein upon insertion of the second base portion into the first receptacle portion the receptacle and base edge portions engage to attach the first module to the second module to form a modular base pan assembly that is expandable;
first and second phase bus bars which are attached to the first and second modules by snaps;
a third phase bus bar located on a back side of the first and second modules; and
a plurality of insulators for insulating a third phase bus bar, wherein each insulator includes a post that is inserted through the third phase bus bar and is attached to the base pan assembly to secure the third phase bus bar between the insulators and the first and second modules.

17. The modular base pan according to claim 16, further including an overlap section between the first and second modules.

18. The modular base pan according to claim 16, further including an overlap section between each pair of the insulators.

19. The modular base pan according to claim 16, wherein the first and second modules each include fingers for capturing a flange on each post.

20. The modular base pan according to claim 16, wherein the post includes a snap ring for capturing the third phase bus bar.

* * * * *